United States Patent [19]

Olofson

[11] Patent Number: 5,847,265
[45] Date of Patent: Dec. 8, 1998

[54] PINHOLE TEST

[75] Inventor: Mark A. Olofson, St. Cloud, Minn.

[73] Assignee: Champion International Corporation, Stamford, Conn.

[21] Appl. No.: 844,510

[22] Filed: Apr. 18, 1997

[51] Int. Cl.[6] .................................................. G01M 3/04
[52] U.S. Cl. ................................................. 73/40; 73/159
[58] Field of Search .............................. 73/38, 159, 156, 73/37.7, 40

[56] References Cited

U.S. PATENT DOCUMENTS

| | | | |
|---|---|---|---|
| 2,310,111 | 2/1943 | Norlander | 73/38 |
| 3,254,526 | 6/1966 | Yarbrough | 73/38 |
| 3,405,555 | 10/1968 | Wissinger et al. | 73/159 |
| 3,675,476 | 7/1972 | Zapfe | 73/159 |
| 3,811,317 | 5/1974 | Leonard et al. | 73/40 |
| 3,937,064 | 2/1976 | Wolf, Jr. et al. | 73/40 |
| 4,541,273 | 9/1985 | Bery | 73/159 |

Primary Examiner—Ronald L. Biegel
Attorney, Agent, or Firm—Richard C. Stewart

[57] ABSTRACT

A method for measuring the size and magnitude of pinholes in a sheet of paper, comprising placing a test sheet of paper on top of a backing sheet and spreading ink, oil or stain across the test paper. Uniform pressure is applied to the test paper in sufficient magnitude to force the ink through any pinholes in the test paper and to create an imprint on the backing sheet. The backing sheet is then removed and allowed to dry. The imprint is then analyzed to determine the number and size of the pinholes in the test paper.

10 Claims, 1 Drawing Sheet

PINHOLE TEST

BACKGROUND OF THE INVENTION

1. Field of the Invention

This invention relates to a method for measuring the frequency and magnitude of pinholes in a sheet of paper. In particular, this invention relates to a method to measure pinholes by forcing ink or other liquid through such holes and measuring the printed marks resulting therefrom.

SUMMARY OF THE INVENTION

In the printing field, paper often develops irregularities that detract from its quality. One of these features is the appearance of pinholes in the paper. The greater the number and size of the pinholes, the lower the quality of paper. It is desirable to have a way to measure the pinholes so as to have a reliable method to assess the quality of a particular type or batch of paper.

It is an object of the invention to provide a method for assessing the quality of paper by measuring the frequency and magnitude of pinholes in the paper.

It is another object of the invention to provide a method for measuring the pinholes in a sheet of paper in an easy and inexpensive manner.

The method according to the invention comprises positioning a sheet of the paper to be tested on top of a backing sheet, applying ink or other viscous liquid to the top of the test sheet with uniform pressure to force some of the liquid through any pinholes in the sheet and onto the backing sheet underneath. The test sheet is then discarded and the backing sheet is allowed to dry. The imprint on the backing sheet is then scanned into a computer for image analysis of the pinholes, or analyzed in another manner.

Preferably, the test is performed on a printing press using black ink as the liquid and a paper having high smoothness as the backing paper. However, the invention could also be accomplished by means other than a press.

In an alternative embodiment, instead of backing paper, the reverse side of the test paper may also be analyzed.

The method of the invention provides the ability to make changes in refining, retention and other papermaking variables to improve sheet uniformity. The method also allows for evaluation of changes in paper manufacturing equipment and allows for comparisons between various pieces of equipment. The method also provides a means for evaluating the interaction of different coating materials with a base sheet of paper.

The invention also serves a competitive purpose and allows a paper manufacturer to evaluate a competitor's products. Finally, the invention provides a means for testing whether pinhole frequency and magnitude affects final sheet gloss development or print quality.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the one view.

Figure 1:
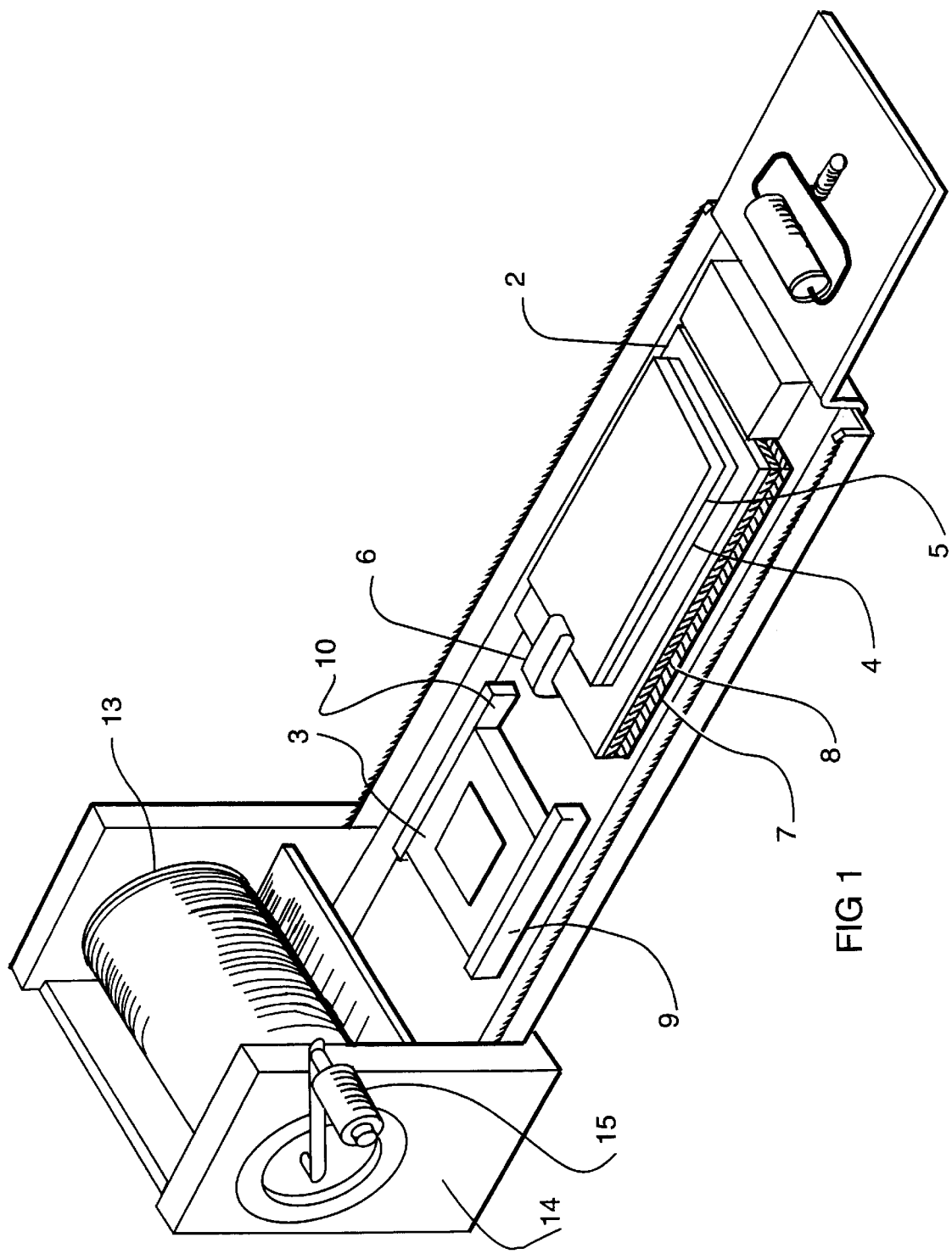
FIG. 1 is a side perspective view of a press that can be used to practice the method of the invention.

Other objects and features of the present invention will become apparent from the following detailed description of the preferred method for performing the invention.

DETAILED DESCRIPTION OF THE PREFERRED EMBODIMENT

Turning now in detail to the drawing, and in particular, FIG. 1, there is shown a typical press 1 that can be used to practice the method of the invention. In the preferred method of performing the pinhole analysis test of the invention, samples of paper to be tested 5 are cut to a size of approximately 4 inches by 8 inches. A backing plate 2 is installed printing press 1 to be used for the test. A sheet of backing paper 4, preferably one of high smoothness, is placed on backing plate 2. One sheet of the sample to be tested 5 is then placed on top of the backing sheet, and both sheets are inserted in a clipboard clamp 6 on backing plate 2.

Backing plate 2 is underpacked with two steel shim plates 7 and 8 that are preferably 0.25 inches thick each. Plates 7 and 8 can be removed for stock of greater thickness. When both plates are removed, stock of up to 0.075 inches thick can be tested.

A printing plate 3 is inserted into press 1. Printing plate 3 preferably has guide tracks 9, 10 running along each side.

Black ink is stirred and spread in a bead along the leading edge of printing plate 3. Alternatively, other inks, oils or stains may be used. Printing plate 3 preferably has a 3 inch by 6 inch ground surface, ground to 2.0 mils, to provide sufficient ink to penetrate the test sheet. Using an ink scraper, the ink is then drawn across the printing plate so as to cover all of the ground areas of the plate.

A blanket cylinder 13 is mounted in press 1. Blanket cylinder 13 is preferably 7 inches across and 13⅜ inches around. Blanket cylinder 13 is mounted on two steel strips 14. To run the test, blanket cylinder 13 is lowered by moving handle 15 and rolled across inked printing plate 3 to ink cylinder 13. Cylinder 13 does not touch paper 5 at this point. Cylinder 13 is then returned to its starting position.

Cylinder 13 is again lowered and rolled across printing plate 3 and then across paper 5 and finally raised back to its starting position. At this point, sample sheet 5 is discarded and backing sheet 4 is set aside to dry overnight. Printing plate 3 and cylinder 13 are then cleaned to remove all ink traces.

The above steps are then repeated for additional samples of paper.

To analyze the pinholes in the sample, backing sheet 4 is cut to leave a one-inch margin around the printed area. Backing sheet 4 is then placed in an image analyzer scanner to scan the printed image into a computer.

Using standard image analysis software, which is commercially available, the pinhole image is analyzed to give the number of pinholes, size distribution, and total area of the pinholes in the sample. The greater the area, the more and larger pinholes are present in the sample. The total pinhole area gives an exact numerical figure with which to compare different types of paper.

Accordingly, while only one embodiment of the present invention has been described, it is obvious that many changes and modifications may be made thereunto without departing from the spirit and scope of the invention.

What is claimed is:

1. A method for measuring the size and magnitude of pinholes in a sheet of paper, comprising:

placing a backing sheet of paper on a surface of a backing plate;

placing a test sheet of paper on top of said backing sheet;

spreading a material selected from the group consisting of ink, oil or stain across the test paper;

mechanically pressing the surface of the test paper to apply a uniform pressure to the test sheet of paper sufficient to force the material through any pinholes in the test sheet of paper and onto the backing sheet to create an imprint on the backing sheet;

removing the backing sheet and allowing it to dry; and analyzing the imprint on the backing sheet to determine the number and size of the pinholes in the test paper.

2. The method of claim 1, wherein the material is black ink.

3. The method of claim 1, wherein the step of analyzing the material comprises scanning the imprint on the backing sheet into a computer for image analysis.

4. The method of claim 3, wherein the image analysis comprises calculating the total area of the pinholes, the total number of pinholes and the size distribution of the pinholes.

5. Method of claim 1 wherein:

spreading comprises applying said material to a surface of a cylinder and rolling said cylinder across the surface of said test sheet of paper.

6. Method of claim 5 wherein:

mechanically applying uniform pressure comprises rolling a cylinder across said surface of said test sheet of paper having said material spread thereon.

7. A method for measuring the size and magnitude of pinholes in a sheet of paper comprising:

placing a backing sheet of paper on a surface of a backing sheet;

placing a test sheet of paper on top of said backing sheet;

spreading a material selected from the group consisting of ink, oil or stain on a surface of said test sheet of paper;

applying uniform pressure to said top surface of said test sheet sufficient to force material on said surface through any pinholes in the test sheet of paper and onto the backing sheet to create an imprint of said pinholes on the back sheet by pressing said surface of said test sheet of paper having said material spread thereon;

removing the backing sheet and allowing it to dry; and analyzing the imprint on the backing sheet to determine the number and size of the pinholes in the test paper.

8. The method of claim 7, wherein the step of analyzing the material comprises scanning the imprint on the backing sheet into a computer for image analysis.

9. The method of claim 8, wherein the image analysis comprises calculating the total area of the pinholes, the total number of pinholes, and the size distribution of the pinholes.

10. Method of claim 1 wherein said mechanically pressing comprises rolling a cylinder across the surface of the test sheet of paper.

* * * * *